(12) United States Patent
Cesar et al.

(10) Patent No.: US 6,836,793 B1
(45) Date of Patent: Dec. 28, 2004

(54) METHOD OF DISTRIBUTING DATA PACKETS OF SYSTEM SOFTWARE WHERE THE RECEIVING UNITS ACKNOWLEDGE ONLY PROPER RECEPTION

(75) Inventors: Bozo Cesar, Kornwestheim (DE); Klaus Keil, Esslingen (DE); Joachim Riemer, Korntal (DE)

(73) Assignee: Alcatel, Paris (FR)

( * ) Notice: Subject to any disclaimer, the term of this patent is extended or adjusted under 35 U.S.C. 154(b) by 484 days.

(21) Appl. No.: 09/159,155

(22) Filed: Sep. 23, 1998

(30) Foreign Application Priority Data

Sep. 23, 1997 (DE) .......................... 197 41 870

(51) Int. Cl.[7] .................... G06F 15/177; G06F 9/445
(52) U.S. Cl. ................... 709/221; 709/223; 717/176; 717/177; 717/178
(58) Field of Search ................. 348/13, 14, 15, 348/16, 17, 6, 7; 455/3.1; 709/200, 203, 206, 208, 217, 218, 219, 221, 222; 717/176–178

(56) References Cited

U.S. PATENT DOCUMENTS

| 4,654,654 | A | * | 3/1987 | Butler et al. ............. 340/825.5 |
| 5,421,009 | A |   | 5/1995 | Platt ............................... 717/4 |
| 5,561,802 | A |   | 10/1996 | Orimo et al. ................ 709/221 |
| 5,666,293 | A | * | 9/1997 | Metz et al. .................. 709/220 |
| 5,727,002 | A | * | 3/1998 | Miller et al. ................. 714/748 |
| 5,768,539 | A | * | 6/1998 | Metz et al. .................. 709/249 |
| 5,852,735 | A |   | 12/1998 | Urban |
| 5,978,855 | A | * | 11/1999 | Metz et al. .................. 709/249 |
| 6,031,830 | A | * | 2/2000 | Cowan ........................ 370/338 |

FOREIGN PATENT DOCUMENTS

| DE | 4408544 | 9/1995 | ........... G06F/9/445 |
| DE | 4438697 | 5/1996 | ......... G06F/15/177 |
| DE | 4438698 | 5/1996 | ......... G06F/15/177 |
| EP | 0714066 | 5/1996 | ........... G06F/12/08 |
| EP | 0762704 | 3/1997 | ........... H04L/29/06 |
| GB | 2296167 | 6/1996 | ........... H04L/12/18 |
| GB | 2311389 | 9/1997 | ........... G06F/9/445 |

OTHER PUBLICATIONS

On–line maintenance with on–the–fly software replacement, Hauptmann, S. and Wasel, J., Philips Res. Lab., Aachen, Germany, Proceedings., International Conference on May 6–8, 1996, ISBN: 0–8186–7395–8, IEEE: 96TB100046, May 1996.*

(List continued on next page.)

*Primary Examiner*—Ario Etienne
*Assistant Examiner*—Beatriz Prieto

(57) ABSTRACT

In a point-to-multipoint system (SYS), particularly a video-on-demand system, comprising a send unit (SERVER) in the form of a server and a plurality of receive units (DEC) in the form of decoders, a new version of the system software for the decoders is to be transferred to the latter. This is done by taking the following steps:

1. An announce signal containing the information that the new system software or part thereof will subsequently be transferred is transmitted from the server to all decoders simultaneously.
2. The system software or part thereof is transferred in the form of data packets from the server to all decoders simultaneously.

By the advance information in the form of an announce signal which is transmitted to all decoders by the broadcast method, the decoders are notified of the forthcoming transmission of the current version of the system software, whereupon they can prepare for the reception of the new version. The new version is also transmitted by the broadcast method, and ideally only once.

10 Claims, 1 Drawing Sheet

OTHER PUBLICATIONS

Updating Software and Configuration Data in a Distributed Communications Network, C. Symborski, *Proc. of the Computer Networking Symposium*, IEEE Comput. Soc. Press, 1998, pp. 331–338.

"Set–Top Box Control Software: A Key Component in Digital Video", K. Rath et al, *Philips Journal of Research*, vol. 50, No. 1/2, 1996, pp. 185–199.

"Method for Enabling Softwwre Updates through the Internet", *IBM Technical Disclosure Bulletin*, vol. 40, No. 3, Mar. 1997, pp. 123–124.

"Updating Software and configuration Data in a Distributed Communications Network", C. Symborski, *Proceedings of the Computer Networking Symposium*, IEEE Comput. Soc. Press, 1998, pp. 331–338.

Set–Top Box control Software: A Key Component in Digital Video, K. Rath et al, Philips Journal of Research, vol. 50, No. 1/2, 1996, pp. 185–199.

\* cited by examiner

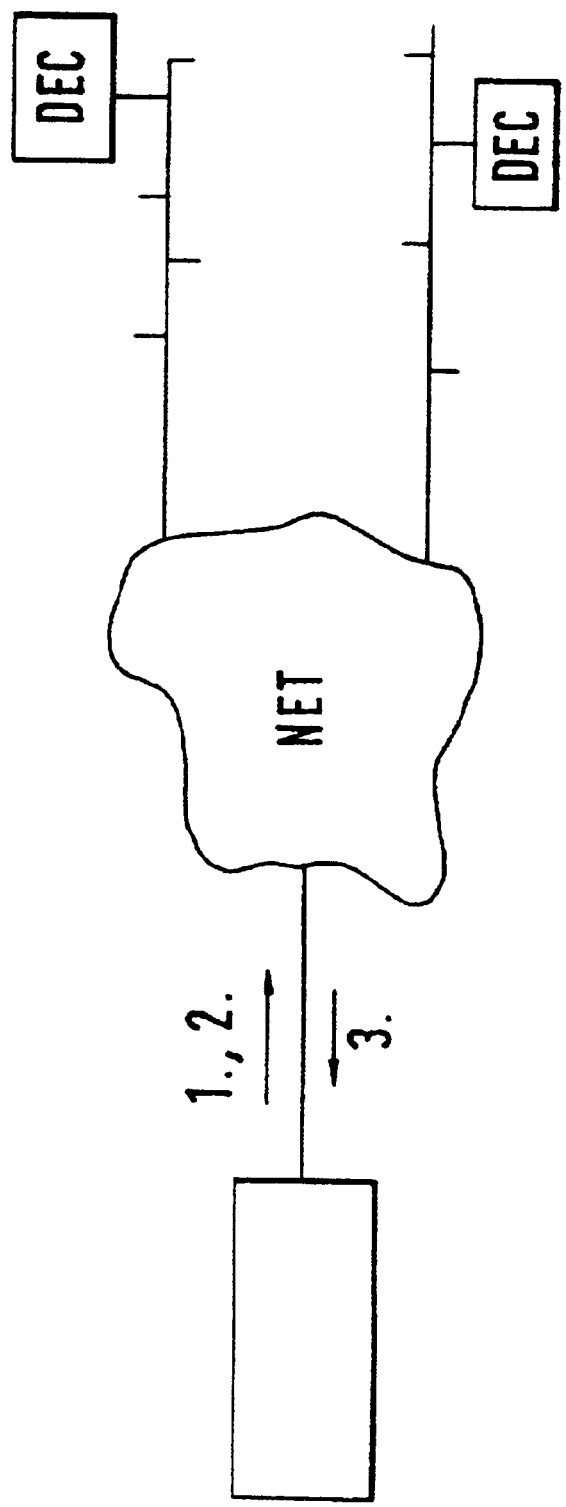

METHOD OF DISTRIBUTING DATA PACKETS OF SYSTEM SOFTWARE WHERE THE RECEIVING UNITS ACKNOWLEDGE ONLY PROPER RECEPTION

BACKGROUND OF THE INVENTION

1. Technical Field

This invention relates to a method of distributing data packets of system software in a point-to-multipoint system from a send unit to a plurality of receive units.

2. Discussion of Related Art

In a point-to-multipoint system, particularly a service-on-demand system, a server is provided as a send unit, and the receive units are decoders. The decoders are designed as set-top boxes. The system software of the set-top boxes needs to be updated when a new version of the system software is available.

From an article by Carl W. Symborski, "Updating Software And Configuration Data In A Distributed Communications Network", Proceedings of the Computer Networking Symposium, IEEE Comput. Soc. Press, 1988, pages 331–338, a procedure for distributing data packets of system software in a point-to-multipoint system is known. The procedure is executed in a receive unit and consists of the following steps:

1. Wait until a predetermined period of time has expired or a notice has been received that a new version of the system software may be available.
2. Request information from the server as to whether a new version is available.
3. Compare the version communicated by the server with the version available in the receive unit.
4. If no change is detected, return to step 1.
5. If a change is detected, request the new version from the server.
6. Replace the old version with the new one.
7. Store the new version.
8. Return to step 1.

Thus, to obtain the new version of the system software, this procedure always requires an action by the receive unit together with a request to the server. If a plurality of receive units are present, each receive unit must request the new version by itself. Because of the structure of the distribution system, the new version, which is generally identical for all receive units, is transmitted from the send unit to the receive units separately. If there are 500 receive units, the send unit must transmit the new version 500 times, once to each receive unit. This takes a certain time. Thus, the transmission of further information is unnecessarily blocked, at least in a predetermined frequency range, for a certain period of time.

From an article by K. Rath and J. W. Wendorf, "Set-Top Box Control Software: a Key Component in Digital Video", Philips Journal of Research (1996), Vol. 50, No. 1/2, pages 185–199, a method of distributing data packets of system software in a point-to-multipoint system is known in which a receive unit designed as a set-top box obtains a new version of the system software telemetrically via a network. The set-top box sends a request to the server or obtains the new version from the server automatically on a periodic basis. The former corresponds essentially to the procedure described above. The latter involves the establishment of a connection between the server and an individual set-top box, which eliminates the need for the set-top box to actively request a new version but does not prevent the multiple transmission of the same information.

SUMMARY OF INVENTION

It is therefore an object of the invention to provide a method whereby the system software can be updated in a simple manner.

According to the invention, this object is attained by a method of distributing data packets of system software in a point-to-multipoint system from a send unit to a plurality of receive units, is characterized in that the following steps are taken one after the other:

1. An announce signal containing the information that the system software or part thereof will subsequently be transmitted is transmitted from the send unit to all receive units simultaneously.
2. The system software or part thereof is transmitted in the form of data packets from the send unit to all receive units simultaneously. The method is characterized in that by advance information in the form of an announce signal which is transmitted to all receive units by the broadcast method, the receive units are notified of the forthcoming transmission of the current version of the system software, whereupon they can prepare for the reception of the new version. The new version is also transmitted by the broadcast method, and ideally only once. If individual receive units should not have received the advance information, the method may, for example, be automatically repeated at a later time or the remaining receive units may request the new version from the server separately. Thus, compared with the prior art, the transmission time is ideally shortened by a factor corresponding to the number of receive units present, i.e., by a factor 500 if there are 500 receive units. If, for example, 10% of the receive units should not have received the advance information, the transmission time is still shortened by a factor of 250 (in case of automatic repetition) or approximately 100 (if separate requests are made).

BRIEF DESCRIPTION OF THE DRAWING

The invention will become more apparent from the following description of an embodiment when taken in conjunction with the accompanying drawing. The single FIGURE of the drawing is a schematic representation of a point-to-multipoint system according to the invention for carrying out the method according to the invention.

DETAILED DESCRIPTION OF PREFERRED EMBODIMENTS

The point-to-multipoint SYS comprises a send unit SERVER, a network NET, and a plurality of receive units DEC.

The point-to-multipoint system SYS is designed, for example, as a service-on-demand system. The send unit SERVER contains a server which is connected via the network NET to the receive units DEC, which are designed as decoders. The point-to-multipoint system SYS makes available a downstream channel and an upstream channel. Via the upstream channel, e.g., a narrow-band channel, customers can transmit information from their decoders through the network NET to the server. The information consists, for example, of request signals by means of which a video film, for example, is requested, which is then broadcast over the downstream channel, e.g., a broadband channel, to all decoders or to a group of decoders in a subarea dependent on the topology of the network. A logon authorization, granted, for example, by issuing a key for each transmission, ensures that only the decoder from which the video film was requested has the right and capability to receive the transmitted video film.

The decoders are designed, for example, as set-top boxes. Each set-top box has system software, i.e., programs that make up the operating system. The system software serves, for example, to receive and process the menu broadcast by the server for the selection of video films and the like. From time to time, the system software is upgraded and updated, or modified to eliminate systematic errors. Each set-top box then needs an update of its system software. A new version of the system software needs to be transferred to the set-top box. This is done by downloading the new version from the server to the set-top boxes. The new version or, if possible, only the changes in the new version from the old one are transmitted in the form of data packets from the server to the set-top boxes through the network NET. As a rule, the system software is the same for all set-top boxes, so that ideally, one download will suffice to transmit the necessary data packets of the new version to all set-top boxes.

The method of distributing the data packets of the system software is carried out in the following steps, which are taken one after the other:

1. From the send unit SERVER, which contains the server, an announce signal containing the information that the system software of the set-top boxes or part of this software will subsequently be transmitted is sent to all receive units DEC, which contain the set-top boxes, simultaneously.
2. From the send unit SERVER, the system software or part thereof is sent in the form of data packets to all receive units DEC simultaneously.

Thus, by the first step, all set-top boxes connected to the network NET are informed that the new version or the changes from the old version will be transmitted by the server shortly. Each set-top box thus has sufficient time to prepare for the reception of the new software. For example, the set-top box may go through a initialization phase in which various checks are made and a buffer storage area is enabled to buffer and subsequently load the system software. The announce signal is received by all set-top boxes, since instead of an address in the header of a data packet, which serves to select a given set-top box, a so-called default address, e.g., XXXXXXXX, is used, which can be received by all set-top boxes.

In the second step, the data packets of the new system software are transmitted from the server to all set-top boxes by the broadcast method. This is also done using the default address. All set-top boxes can receive the transmitted data packets. A single transmission of the data packets thus suffices to transfer the new version of the system software to all set-top boxes prepared by the announce signal. Thus, in ideal circumstances, the system software of all set-top boxes is updated by a single transfer of the new system software.

The announce signal may contain information as to which version of the system software will be transmitted and how much storage capacity is needed. This enables the set-top boxes to determine in advance whether the data packets shortly to be transmitted are to be received or not. If, for example, a set-top box has already received the new version of the system software, e.g., in response to a previous request, via a PCMCIA card, or otherwise, the reception of the new version and the preparation therefor would be unnecessary. The information on the storage capacity required enables the set-top box to check whether sufficient storage space is available for receiving the latest version and, if so, to reserve a corresponding area of the new version.

Between steps 1 and 2 of the method for distributing the data packets of the new system software, the receive units DEC, i.e., the set-top boxes, can buffer the version of this system software, compare it with the version available in the respective set-top box, and, if the two versions are identical, prevent the reception of the data packets transmitted in step 2.

The receive units DEC, i.e., the set-top boxes, then acknowledge the receipt of the last data packet transmitted by the send unit SERVER and belonging to the system software. This has the advantage that the transmission of the data packets is not interfered with by the acknowledgements from the set-top boxes. A repetition of the transmission of individual data packets for individual set-top boxes is not provided for, since this would introduce delays. If a set-top box does not receive individual data packets for some reason or other, it must wait for another transfer of a complete version if this is provided for, or request the new version from the server, which will then send a complete version to the respective set-top box separately.

The acknowledge signals from the set-top boxes contain information for identifying the set-top boxes, e.g., the address of the respective set-top box. The server can thus determine which of the set-top boxes have received the transmitted data packets and which have not. To this end, the server stores in a list, for example, the addresses of those set-top boxes which have acknowledged receipt of the data packets. This may be accomplished, for example, by storing the addresses directly in a separate memory area or by providing the respective addresses of the set-top boxes with an identifier if all of them have already been stored in a list. By comparing the received acknowledgements with the number of set-top boxes available, the server can determine to how many set-top boxes the new version has been successfully transmitted. From this, a success ratio can be determined, e.g., 80%. Based on this ratio, the server can decide whether or not to repeat the transmission with the preceding announce signal at a later time. Furthermore, the address information can be used to determine whether transmission errors are present in locally limited areas, e.g., if no acknowledgement is received from those set-top boxes which are connected to a subarea dependent on the topology of the network.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method of distributing data packets of a new version of system software in a point-to-multipoint system (SYS) from a send unit (SERVER) to a plurality of receive units (DEC), wherein at least part of the receive units (DEC) each include a decoder, and wherein the new version of the system software is an upgrade, update, or modified version of the operating system software of the decoders, characterized in that the following steps are taken one after the other:

1. an announce signal, containing information that the system software or part thereof will subsequently be transmitted, is transmitted from the send unit (SERVER) to all receive units (DEC) simultaneously, and 2. the system software or part thereof is transmitted as data packets from the send unit (SERVER) to all receive units (DEC) simultaneously, including to receive units (DEC) which will prevent replacement of system software if the new version of the system software has already replaced the old version, wherein the receive units (DEC) acknowledge only proper reception, and only after receipt of a last data packet belonging to the system software, so transmission of the data packets is not interfered with by acknowledgements, and wherein a receive unit (DEC) which receives less than all data packets of the system software or part thereof must subsequently receive a complete version containing all data packets including those already received, and therefore the send unit (SERVER) will send only complete versions of system software.

2. A method as claimed in claim 1, characterized in that the announce signal contains information as to a version of the system software that will be transmitted, and wherein the information as to a version enables the receive unit (DEC) to determine in advance whether the data packets are to be used to replace the system software.

3. A method as claimed in claim 2, characterized in that between steps 1 and 2, the receive units (DEC) buffer the version of the system software identified in the announce signal, compare said version with the version available in the respective receive unit (DEC), and, if the two versions are identical, inhibit replacement of the system software by the data packets transmitted in step 2.

4. A method as claimed in claim 1, characterized in that acknowledge signals from the receive units (DEC) contain information identifying the receive units (DEC), and that the send unit (SERVER) stores in a list information identifying those receive units (DEC) which have acknowledged receipt of the data packets, in order to record which receive unit (DEC) has successfully received transmitted data packets and which has not successfully received transmitted data packets.

5. A method as claimed in claim 4, wherein the server determines a success ratio, and decides based upon the success ratio whether to repeat transmission at a later time.

6. A method as claimed in claim 4, wherein the list indicates whether a locally limited area comprising a plurality of receive units (DEC) is experiencing transmission errors.

7. A method as claimed in claim 1, characterized in that the point-to-multipoint system is a service-on-demand system comprising a server as the send unit (SERVER) and decoders as the receive unit (DEC).

8. A method as claimed in claim 7, characterized in that the decoders are designed as set-top boxes, and that the transmitted data packets serve to update the system software of the set-top boxes.

9. A method as claimed in claim 1, wherein the receive units (DEC) will also prevent replacement of system software if there is insufficient space available for the new version.

10. A method as claimed in claim 1, wherein a receive unit (DEC) may request a new complete version of the system software from the server, but otherwise must wait for another complete transfer of the system software from the server.

* * * * *

UNITED STATES PATENT AND TRADEMARK OFFICE
CERTIFICATE OF CORRECTION

PATENT NO. : 6,836,793 B1
APPLICATION NO. : 09/159155
DATED : December 28, 2004
INVENTOR(S) : B. Cesar et al.

It is certified that error appears in the above-identified patent and that said Letters Patent is hereby corrected as shown below:

Title Page, Item (56), please insert

--Lokale Rechnernetze: Einfugrung und praktische Beispiele, Lindeman, B., VDI Verlag, GmbH, Dusseldorf, Germany 1991, pp. 55-59.--

Signed and Sealed this

Seventeenth Day of July, 2007

JON W. DUDAS
*Director of the United States Patent and Trademark Office*